(12) United States Patent
Fujita et al.

(10) Patent No.: US 11,776,798 B2
(45) Date of Patent: Oct. 3, 2023

(54) ELECTRON TUBE

(71) Applicant: HAMAMATSU PHOTONICS K.K., Hamamatsu (JP)

(72) Inventors: Tetsuya Fujita, Hamamatsu (JP); Takahiro Suzuki, Hamamatsu (JP); Yasuhide Miyazaki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 17/621,322

(22) PCT Filed: Jun. 11, 2020

(86) PCT No.: PCT/JP2020/022999
§ 371 (c)(1),
(2) Date: Dec. 21, 2021

(87) PCT Pub. No.: WO2020/262016
PCT Pub. Date: Dec. 30, 2020

(65) Prior Publication Data
US 2022/0415638 A1 Dec. 29, 2022

(30) Foreign Application Priority Data
Jun. 28, 2019 (JP) .................. 2019-121617

(51) Int. Cl.
*H01J 43/18* (2006.01)
*H01J 43/28* (2006.01)

(52) U.S. Cl.
CPC .............. *H01J 43/18* (2013.01); *H01J 43/28* (2013.01)

(58) Field of Classification Search
CPC .................. H01J 43/18; H01J 43/28
See application file for complete search history.

(56) References Cited

U.S. PATENT DOCUMENTS

| | | |
|---|---|---|
| 3,914,599 A | 10/1975 | Enck, Jr. et al. |
| 6,551,162 B1 | 4/2003 | Pruet et al. |
| | (Continued) | |

FOREIGN PATENT DOCUMENTS

| | | |
|---|---|---|
| JP | 2002-042636 A | 2/2002 |
| JP | 3872419 B2 | 1/2007 |
| | (Continued) | |

OTHER PUBLICATIONS

International Preliminary Report on Patentability dated Jan. 6, 2022 for PCT/JP2020/022999.
(Continued)

*Primary Examiner* — Joseph L Williams
(74) *Attorney, Agent, or Firm* — Faegre Drinker Biddle & Reath LLP

(57) ABSTRACT

An electron tube includes a housing having a window having an electromagnetic wave transmitting property, an electron emission plate disposed inside the housing, the electron emission plate emitting electrons, and a holding member disposed inside the housing and configured to hold the electron emission plate and to apply a voltage to the electron emission plate. The electron emission plate has a first main surface and a second main surface facing each other. The holding member has a base portion being in contact with the first main surface, and a plurality of electron emission plate biasing portions which are in contact with an edge of the second main surface and are configured to elastically bias the electron emission plate to the base portion. The holding member is electrically connected to the second main surface through the plurality of electron emission plate biasing portions.

10 Claims, 7 Drawing Sheets

(56) References Cited

U.S. PATENT DOCUMENTS

| | | |
|---|---|---|
| 9,734,977 B2 | 8/2017 | Costello et al. |
| 2006/0138395 A1 | 6/2006 | Kohno et al. |
| 2006/0220553 A1 | 10/2006 | Fujita |
| 2018/0350574 A1 | 12/2018 | Conley |

FOREIGN PATENT DOCUMENTS

| | | |
|---|---|---|
| WO | WO-2007/119282 A1 | 10/2007 |
| WO | WO-2007/129492 A1 | 11/2007 |

OTHER PUBLICATIONS

Extended European Search Report dated Jul. 6, 2023 in Application No. 20831782.6.

E. Forati et al., "Electron emission by long and short wavelength lasers: Essentials for the design of plasmonic photocathodes," Journal of Applied Physics, American Institode of Physics, vol. 124, No. 8, Aug. 23, 2018, pp. 083101-1 through 083101-13, XP012231029.

*Fig.*3

ELECTRON TUBE

TECHNICAL FIELD

The present invention relates to an electron tube.

BACKGROUND ART

A known electron tube holds an electron emission plate in a housing (for example, Patent Literature 1). The electron emission plate emits electrons in response to an incident of an electromagnetic wave. Patent Literature 1 describes an electron tube in which a photocathode plate is held in a housing.

CITATION LIST

Patent Literature

Patent Literature 1: Japanese Unexamined Patent Publication No. 2002-42636

SUMMARY OF INVENTION

Technical Problem

In the electron tube described in Patent Literature 1, the photocathode plate is held by interposing the photocathode plate between a support plate and an incident window. A voltage is applied to the photocathode plate through the support plate. In this configuration, there is concern that a positional relationship between the support plate and the photocathode plate may not be stable due to a manufacturing error and deformation by a temperature change in each member of the electron tube. When the positional relationship between the support plate and the photocathode plate is not stable, there is concern that a voltage applied to the photocathode plate through the support plate may become unstable. Therefore, it is required to apply a stable voltage to the electron emission plate such as the photocathode plate even when there is the manufacturing error and deformation due to the temperature change.

An object of one aspect of the present invention is to provide an electron tube having an electron emission plate that emits electrons in response to an incident of an electromagnetic wave and having improved stability of a voltage applied to the electron emission plate.

Solution to Problem

An electron tube according to an aspect of the present invention includes a housing, an electron emission plate, and a holding member. The housing has a window having an electromagnetic wave transmitting property. The electron emission plate is disposed inside the housing and emits electrons in response to an incident of the electromagnetic wave. The holding member is disposed inside the housing to hold the electron emission plate. The holding member is configured to apply a voltage to the electron emission plate. The electron emission plate has a first main surface and a second main surface facing each other. The holding member has a base portion being in contact with the first main surface, and a plurality of electron emission plate biasing portions. The plurality of electron emission plate biasing portions are in contact with an edge of the second main surface and are configured to elastically bias the electron emission plate to the base portion. The holding member is electrically connected to the second main surface through the plurality of electron emission plate biasing portions.

In the aspect, the plurality of electron emission plate biasing portions elastically bias the electron emission plate to the base portion (hereinafter, the electron emission plate biasing portion is simply referred to as an "biasing portion"). Therefore, even when there are some manufacturing error and deformation by a temperature in each member of the electron tube, the plurality of biasing portions are in stable contact with the electron emission plate. The holding member is electrically connected to the second main surface of the electron emission plate through the plurality of biasing portions. Therefore, the stability of the voltage applied to the second main surface of the electron emission plate through the plurality of biasing portions of the holding member is improved.

In the aspect, the plurality of biasing portions may be disposed at rotationally symmetric positions when viewed from the normal direction of the second main surface. In this case, the biasing force is evenly applied to the electron emission plate by the plurality of biasing portions. Therefore, the electron emission plate is in stable contact with the plurality of biasing portions.

In the aspect, the plurality of biasing portions may have a plate shape. The thickness of each biasing portion may be smaller than the thickness of the electron emission plate. In this case, the biasing force applied to the electron emission plate from each biasing portion is reduced. Therefore, the breakage of the electron emission plate is suppressed.

In the aspect, each biasing portion may be divided into a plurality of parts. Each of the plurality of parts may elastically bias the electron emission plate to the base portion. In this case, the biasing force from each biasing portion is more stably applied to the electron emission plate. Therefore, the electron emission plate is more stably in contact with the plurality of biasing portions.

In the aspect, the holding member may have a frame plate portion and a spacer. The frame plate portion may include a plurality of electron emission plate biasing portions and a flat plate portion integrally formed with the plurality of electron emission plate biasing portions. The spacer may be interposed between the base portion and the flat plate portion, and surround the edge of the electron emission plate. The plurality of biasing portions may project from the flat plate portion, and elastically bias the electron emission plate to the base portion. A thickness of the spacer may be less than or equal to a thickness of the electron emission plate. In this case, the spacer surrounding the edge of the electron emission plate more reliably holds the electron emission plate in the direction orthogonal to the thickness direction of the electron emission plate. Since the thickness of the spacer is less than or equal to the thickness of the electron emission plate, an biasing force applied to the electron emission plate in the thickness direction of the electron emission plate by the plurality of biasing portions is stably ensured. Therefore, the electron emission plate is more reliably held in the thickness direction of the electron emission plate.

In the aspect, an opening may be formed in the frame plate portion. This opening is defined by the plurality of electron emission plate biasing portions and the flat plate portion. The plurality of electron emission plate biasing portions may extend from the flat plate portion to the center side of the opening in directions facing each other.

In the aspect, an opening may be formed in the base portion. An electromagnetic wave having passed through the window enters this opening. This opening may have a rectangular shape or a circular shape. The base portion may be in contact with the first main surface at the edge defining the opening. In this case, the electron emission plate is held more stably, and the electromagnetic wave can be incident on the electron emission plate.

In the aspect, the electron emission plate may be a field assist type photocathode. In this case, an electric field is formed in the electron emission plate, and the electric field emits electrons from the second main surface of the electron emission plate. Therefore, the electron emission plate emits electrons from the second main surface in response to an incident of an electromagnetic wave having a frequency band from infrared light to ultraviolet light, for example.

In the aspect, the electron emission plate may have a metasurface configured to emits electrons in response to an incident of an electromagnetic wave. In this case, the electron emission plate emits electrons from the metasurface in response to the incident of electromagnetic wave in the frequency band from millimeter waves to infrared light, for example.

In the aspect, the housing may have a tubular shape. The holding member may have a plurality of springs configured to position the holding member with respect to the housing by applying an biasing force to the inner side surface of the housing. In this case, the holding member is stably held with respect to the housing even when there is some manufacturing error or deformation by a temperature change in each member of the electron tube.

Advantageous Effects of Invention

One aspect of the present invention provides an electron tube capable of stably applying a voltage to an electron emission plate configured to emit electrons in response to an incident of an electromagnetic wave.

DESCRIPTION OF EMBODIMENTS

Hereinafter, an embodiment of the present invention will be described in detail with reference to the accompanying drawings. Note that in the description, the same reference symbol will be used for the same element or an element having the same function, and duplicate description will be omitted.

Figure 1:
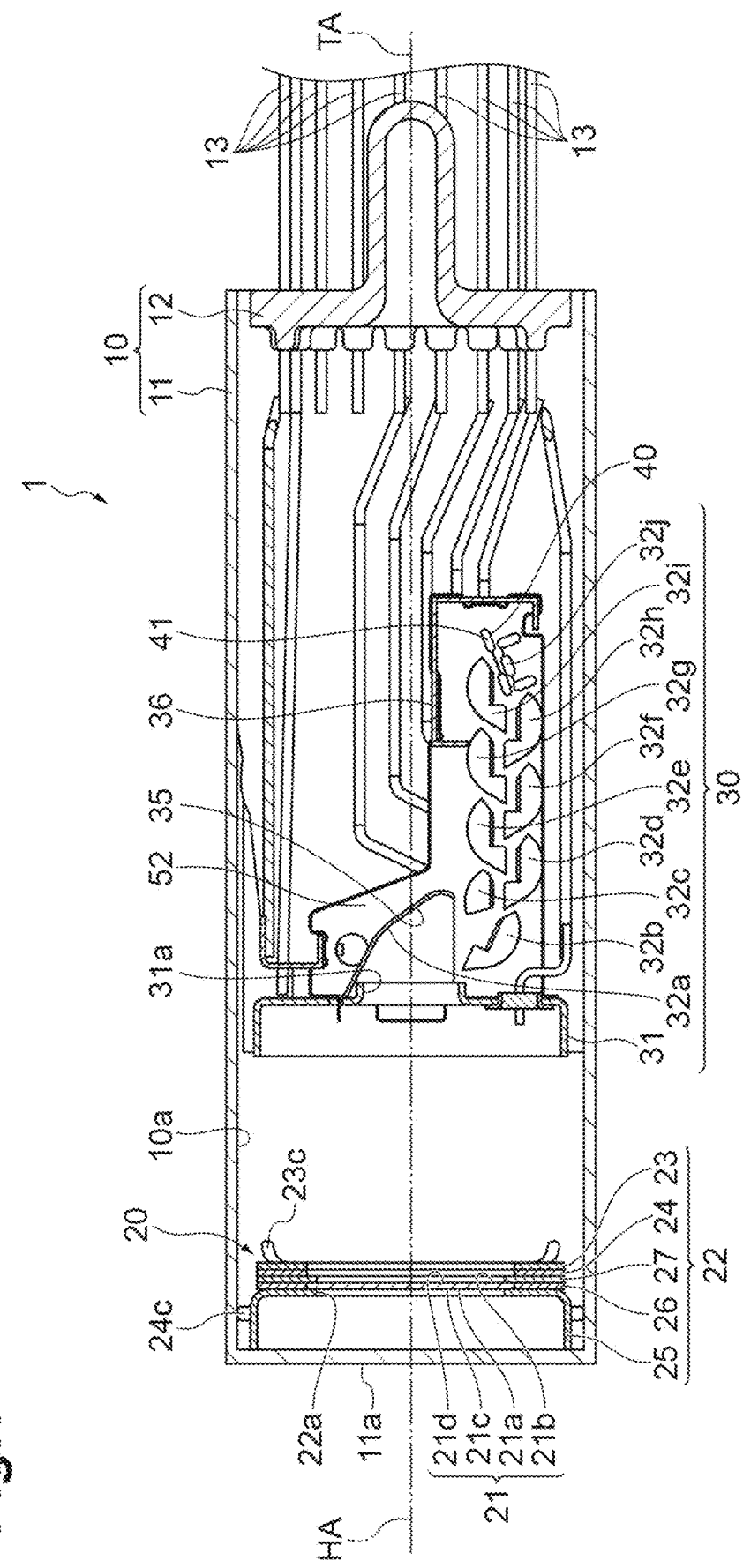
FIG. 1 is a cross-sectional view illustrating an electron tube according to an embodiment.

First, a configuration of an electron tube according to the present embodiment will be described with reference to FIGS. 1 and 2. FIG. 1 is a cross-sectional view illustrating an example of the electron tube.

An electron tube 1 is a photomultiplier tube that outputs an electric signal in response to an incident of an electromagnetic wave. In the present specification, an "electromagnetic wave" entering the electron tube is an electromagnetic wave having a frequency band of so-called millimeter wave to ultraviolet light. The electron tube 1 emits electrons and multipliers the emitted electrons, when an electromagnetic wave enters the electron tube 1. In the present embodiment, the electron tube 1 causes an electromagnetic wave to enter a photoelectric surface and multiplies the electrons emitted from the photoelectric surface by the external photoelectric effect. As illustrated in FIG. 1, the electron tube 1 includes a housing 10, an electron emitting unit 20, an electron multiplying unit 30, and an electron collecting unit 40.

The housing 10 has a valve 11 and a stein 12. The inside of the housing 10 is held in a vacuum by being hermetically sealed by the valve 11 and the stein 12. The vacuum includes not only an absolute vacuum but also a state filled with a gas having a pressure lower than the atmospheric pressure. For example, the inside of the housing 10 is held at $1 \times 10^{-4}$ to $1 \times 10^{-7}$ Pa. The valve 11 has a window 11a having an electromagnetic wave transmitting property. In the present specification, the term "electromagnetic wave transmitting property" refers to a property that at least a part of a frequency band of an incident electromagnetic wave is transmitted. In the present embodiment, the housing 10 has a cylindrical shape. The stein 12 is included in a bottom surface of the housing 10. The valve 11 is included in a side surface of the housing 10 and a bottom surface facing the stein 12.

The window 11a is included in the bottom surface facing the stein 12. The window 11a has, for example, a circular shape in a plan view. A frequency characteristic of a transmittance of an electromagnetic wave differs depending on the material. Therefore, the window 11a is made of an optimum material according to the frequency band of the electromagnetic wave entering the electron tube 1. For example, the window 11a includes, for example, at least one type selected from quartz, silicon, germanium, sapphire, zinc selenide, zinc sulfide, magnesium fluoride, lithium fluoride, barium fluoride, calcium fluoride, magnesium oxide, calcium carbonate, UV glass, and borosilicate glass. By constructing the window 11a using a material selected from these materials, an electromagnetic wave in any frequency band from millimeter waves to ultraviolet light can be guided to the inside of the housing 10.

The electron tube 1 further has a plurality of wires 13 that allows electric connection between the outside and the inside of the housing 10. The plurality of wires 13 is, for example, lead wires or pins. In the present embodiment, the plurality of wires 13 is pins penetrating the stein 12 and extends from the inside to the outside of the housing 10.

At least one of the plurality of wires 13 is connected to various members provided inside the housing 10.

The electron emitting unit 20 is disposed inside the housing 10, and emits electrons inside the housing 10 in response to the incident of the electromagnetic wave. The electron emitting unit 20 has an electron emission plate 21 that emits electrons in response to the incident of the electromagnetic wave, and a holding member 22 that holds the electron emission plate 21. The holding member 22 applies a voltage to the electron emission plate 21.

The electron emission plate 21 has a main surface 21a and a main surface 21b facing each other. For example, when the main surface 21a is included in a first main surface, the main surface 21b is included in a second main surface. The main surface 21a and the main surface 21b are disposed parallel to the window 11a. The main surface 21a faces the window 11a. The main surface 21a includes an incident surface 21c on which an electromagnetic wave having passed through the window 11a is incident. The main surface 21b includes an emission surface 21d that emits electrons.

In the present embodiment, the electron emission plate 21 is a field assist type photocathode. In the present embodiment, the electron emission plate 21 emits electrons by the external photoelectric effect when an electromagnetic wave is incident. In the present embodiment, the electron emission plate 21 emits electrons in response to an incident of an electromagnetic wave having a frequency band from infrared light to ultraviolet light, for example. For example, the electron emission plate 21 has, as the emission surface 21d, a photoelectric surface containing Cs—I, Cs—Te, Sb—Cs, bialkali (Sb—Rb—Cs, Sb—K—Cs, and Sb—Na—K), multi-alkali (Sb—Na—K—Cs), Ag—O—Cs, GaAsP (Cs), GaAs (Cs), InGaAs (Cs), InP/InGaAsP (Cs), InP/InGaAs (Cs), etc.

The holding member 22 is positioned with respect to an inner side surface 10a of the housing 10. That is, the holding member 22 positions the electron emission plate 21 with respect to the housing 10. The holding member 22 has a frame shape along the side surface 10a of the housing 10. A penetration opening 22a is formed in the holding member 22. When viewed from a direction orthogonal to the main surfaces 21a and 21b of the electron emission plate 21, the incident surface 21c and the emission surface 21d of the electron emission plate 21 are disposed inside an edge defining the penetration opening 22a. In a state in which the holding member 22 is positioned with respect to the housing 10, a pipe shaft TA of the housing 10 passes through the penetration opening 22a. The holding member 22 is positioned with respect to the housing 10 so that an optical axis of the electromagnetic wave passing through the penetration opening 22a (hereinafter, referred to as an "axis of the holding member 22") is parallel to the pipe shaft TA of the housing 10. The axis HA of the holding member 22 is orthogonal to the main surfaces 21a and 21b of the electron emission plate 21. The holding member 22 is connected to at least one of the plurality of wires 13.

Figure 2:
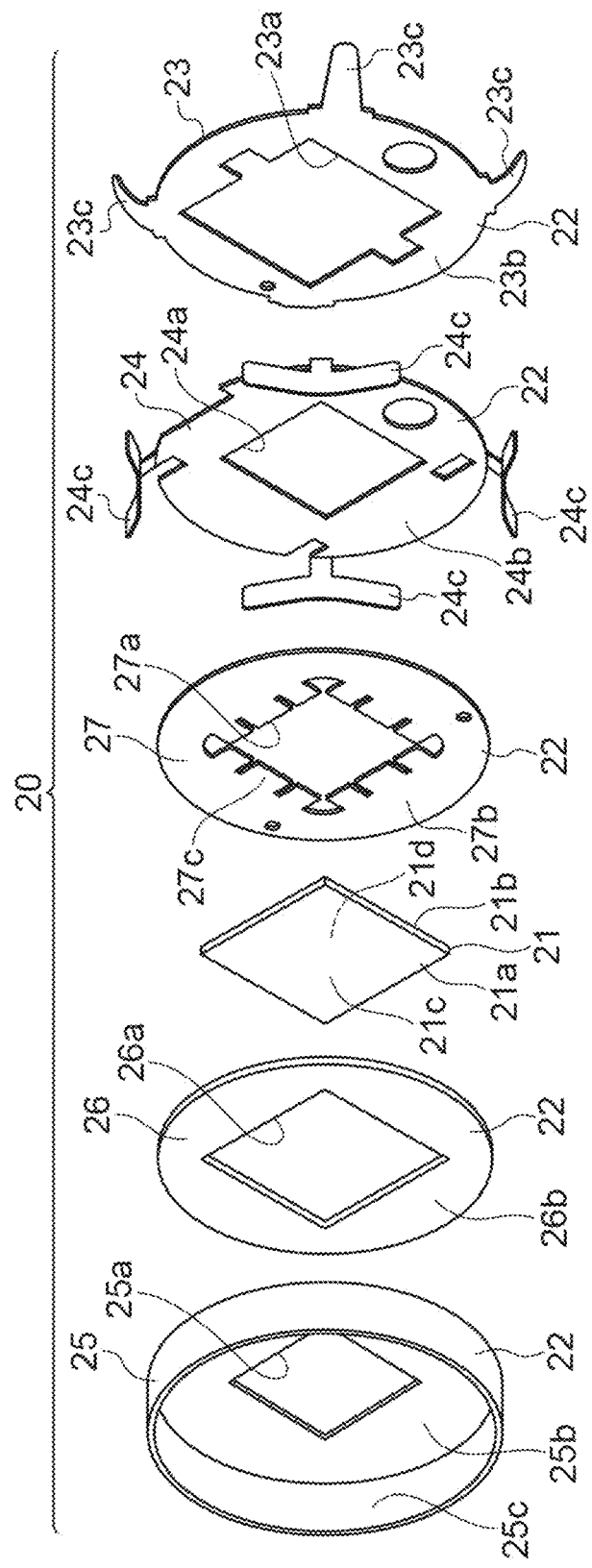
FIG. 2 is an exploded perspective view of a holding member.

FIG. 2 is an exploded perspective view of the holding member 22. The holding member 22 has a first positioning portion 23, a second positioning portion 24, a base portion 25, a spacer 26, and a frame plate portion 27. The first positioning portion 23, the second positioning portion 24, the base portion 25, the spacer 26, and the frame plate portion 27 are welded to each other while holding the electron emission plate 21. In a state where the holding member 22 is positioned in the housing 10, the base portion 25, the spacer 26, the frame plate portion 27, the second positioning portion 24, and the first positioning portion 23 are located in this order from the window 11a side. Each of the first positioning portion 23, the second positioning portion 24, the base portion 25, the spacer 26, and the frame plate portion 27 has conductivity. At least the frame plate portion 27 is electrically connected to the wire 13.

The electron multiplying unit 30 is disposed inside the housing 10 and has an incident surface 35 on which the electrons emitted from the electron emitting unit 20 are incident. The electron multiplying unit 30 multiplies the electrons incident on the incident surface 35. In the present embodiment, the main surface 21b of the electron emission plate 21 faces the incident surface 35 of the electron multiplying unit 30. That is, the emission surface 21d of the electron emission plate 21 faces the incident surface 35 of the electron multiplying unit 30, and the electrons emitted from the emission surface 21d are incident on the incident surface 35. The main surface 21a of the electron emission plate 21 faces the window 11a of the housing 10.

In the present specification, an expression "α faces β" means that β is located in a normal direction of a with respect to a plane tangent to α. In other words, the expression "α faces β" means that when a space is divided into two parts by a surface in contact with α, β is located on the α side, not on the back side of α. For example, in the electron tube 1, as described above, the emission surface 21d of the electron emission plate 21 faces the incident surface 35 of the electron multiplying unit 30, which means that the incident surface 35 of the electron multiplying unit 30 is located in the normal direction of the emission surface 21d with respect to a plane in contact with the emission surface 21d.

In the present embodiment, as illustrated in FIG. 1, the electron multiplying unit 30 has a so-called line focus type multi-stage dynode. In the present embodiment, the electron multiplying unit 30 has a focusing electrode 31 for focusing electrons and a plurality of stages of dynodes 32a, 32b, 32c, 32d, 32e, 32f, 32g, 32h, 32i, and 32j separated from each other. The dynode 32a includes the incident surface 35 described above. In the present embodiment, the electron multiplying unit 30 has ten stages of dynodes 32a to 32j. A circular incident opening 31a is provided at a center of the focusing electrode 31. The dynodes 32a to 32j are disposed after the incident opening 31a. One of the plurality of wires 13 is connected to each of the dynodes 32a to 32j. A predetermined potential is applied to each of the dynodes 32a to 32j through the wires 13. The dynodes 32a to 32j multiply the electrons having passed through the incident opening 31a according to the applied potential.

The electron collecting unit 40 is disposed inside the housing 10, and collects the electrons multiplied by the electron multiplying unit 30. In the present embodiment, the electron collecting unit 40 has a mesh-shaped anode 41. The anode 41 faces the main surface 21b of the electron emission plate 21. One of the plurality of wires 13 is connected to the anode 41. A predetermined potential is applied to the anode 41 through the wires 13. The anode 41 captures the electrons multiplied by the dynodes 32a to 32j. The electron collecting unit 40 may have a diode instead of the anode 41.

In the present embodiment, the electron tube 1 has a pair of insulating substrates 52 for fixing the dynodes 32a to 32j and the anode 41 inside the housing 10. The pair of insulating substrates 52 is made of alumina. The pair of insulating substrates 52 faces each other. The dynodes 32a to 32j have a pair of ends extending in opposite directions of the pair of insulating substrates 52. The anode 41 has a pair of ends extending in the opposite directions of the pair of insulating substrates 52. Each end of the dynodes 32a to 32j and the anode 41 is inserted into a slit-shaped through-hole provided in advance in the pair of insulating substrates 52.

The electron tube 1 has a shielding plate 36 that partially surrounds the dynodes 32a to 32j and the anode 41. The shielding plate 36 prevents light and ions generated by the collision of electrons multiplied by the dynodes 32a to 32j from scattering inside the housing 10. The shielding plate 36 is connected to one of the plurality of wires 13. A predetermined potential is applied to the shielding plate 36 through the wires 13.

Figure 3:
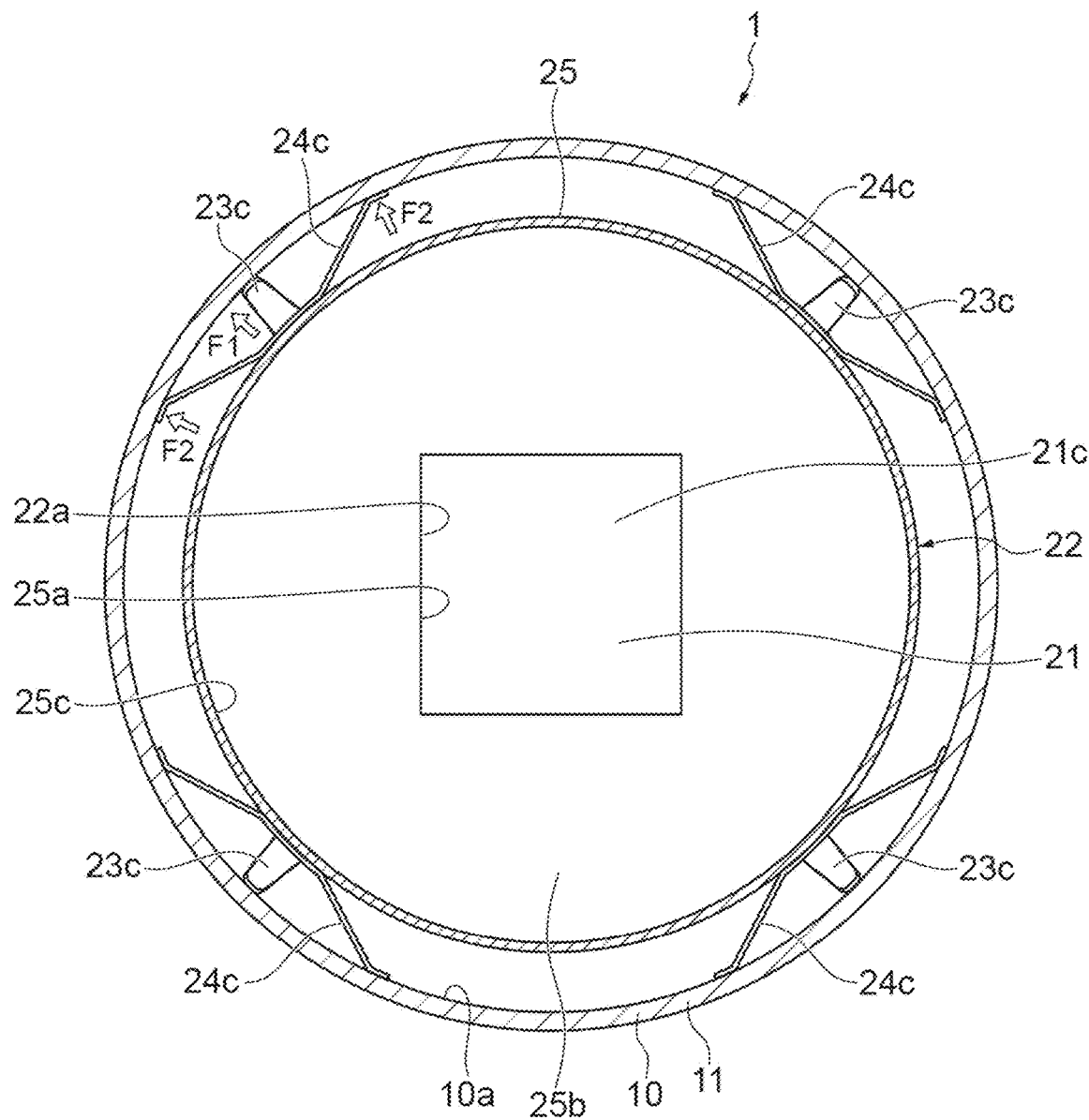
FIG. 3 is a diagram illustrating a state in which the holding member is positioned in a housing.
Figure 4:
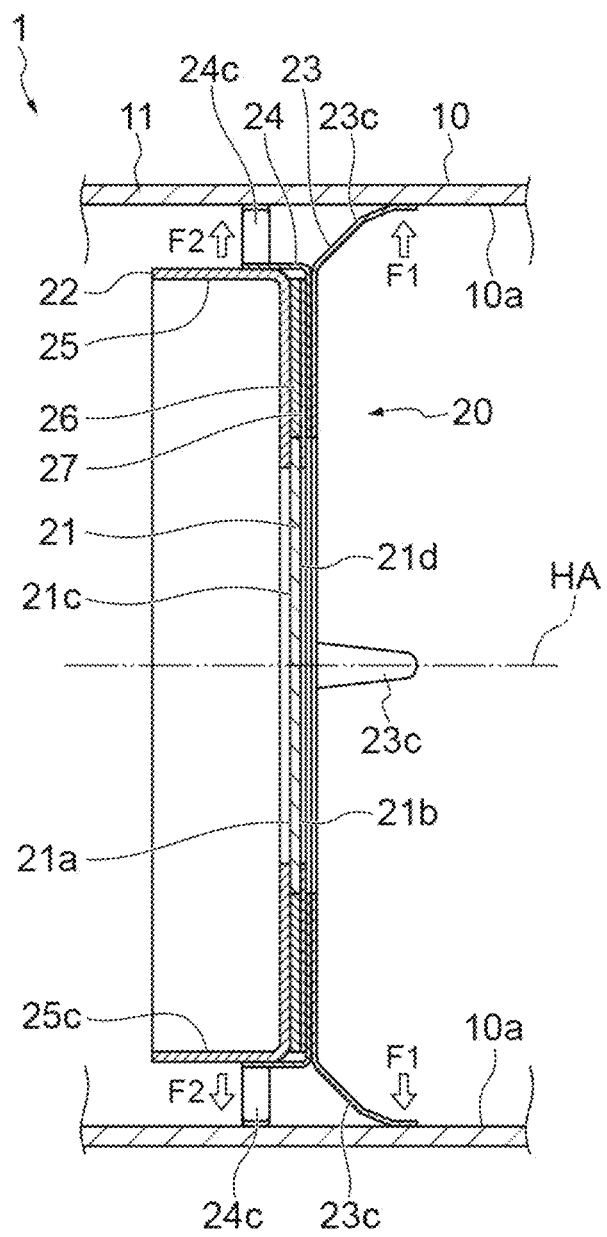
FIG. 4 is a diagram illustrating a state in which the holding member is positioned in the housing.
Figure 5:
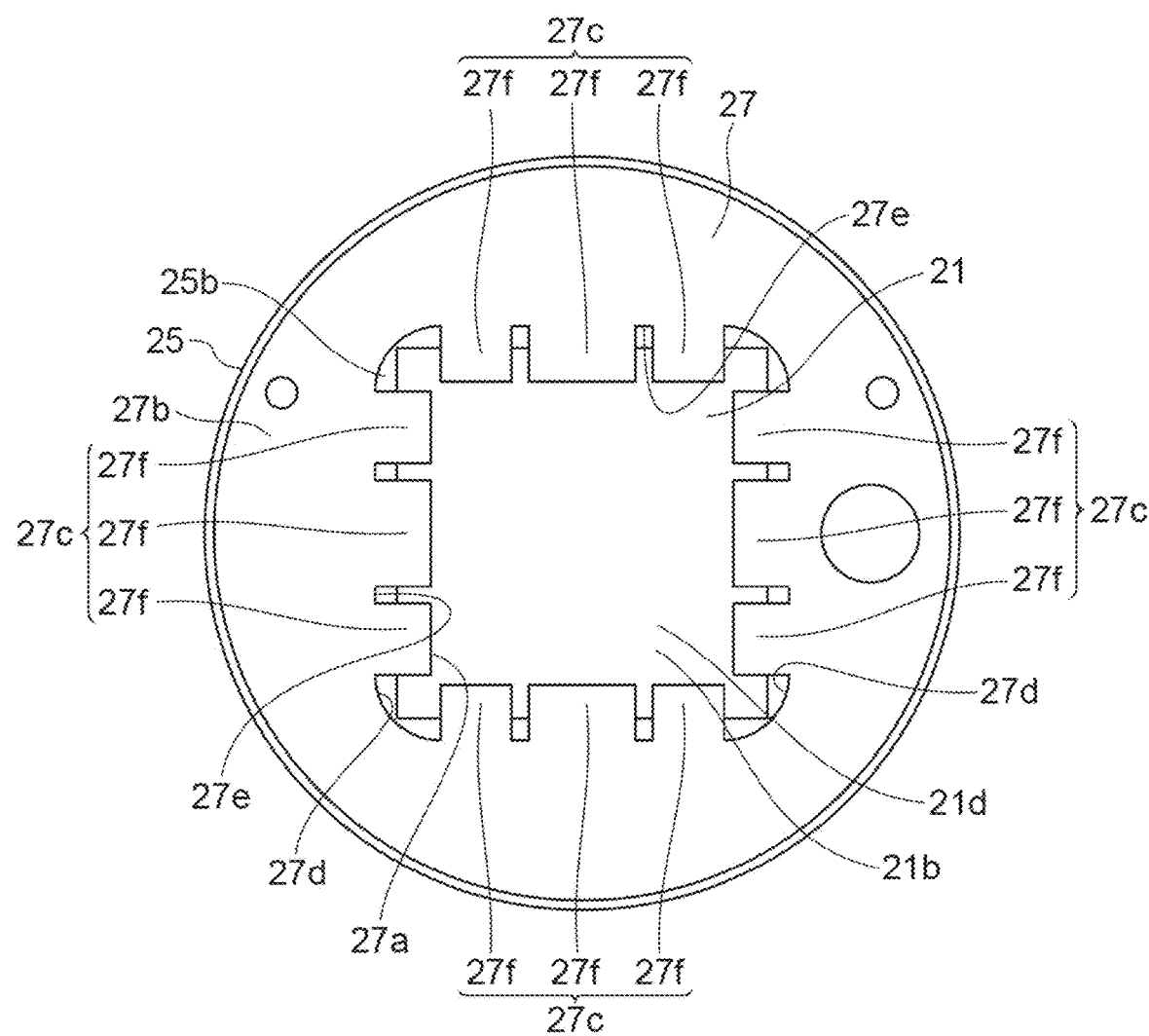
FIG. 5 is an enlarged plan view illustrating a state in which a frame plate portion biases an electron emission plate.
Figure 6:
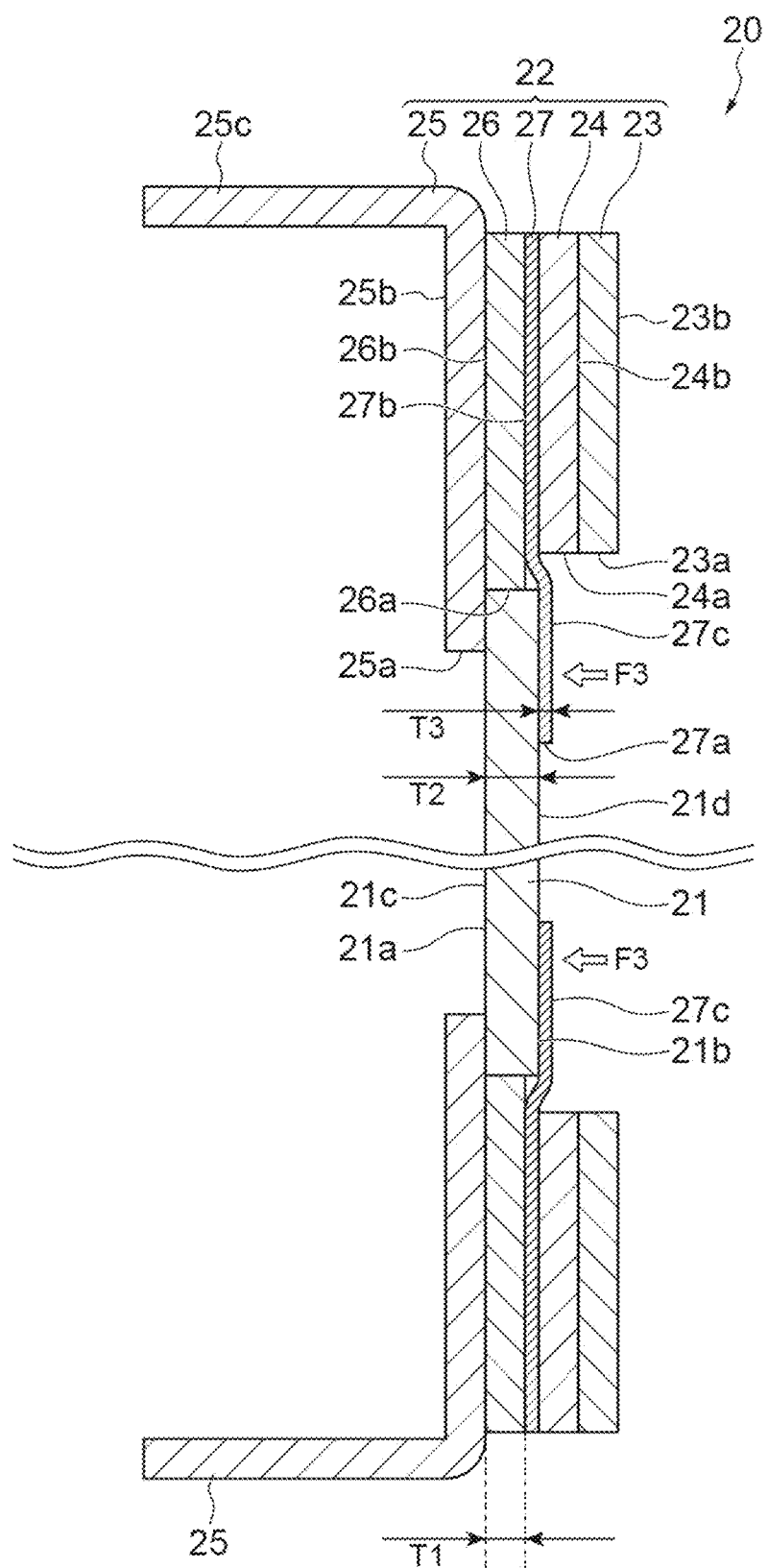
FIG. 6 is an enlarged end view of the holding member.

Next, a configuration of the holding member 22 in the electron emitting unit 20 will be described in detail with reference to FIGS. 3 to 6. FIGS. 3 and 4 are diagrams illustrating a state in which the holding member 22 is positioned in the housing 10. FIG. 5 is an enlarged plan view illustrating a state in which the frame plate portion 27 is biasing the electron emission plate 21. FIG. 6 is an enlarged end view of the holding member 22.

As illustrated in FIGS. 3 and 4, the first positioning portion 23 and the second positioning portion 24 position the holding member 22 inside the housing 10. The first positioning portion 23 has a flat plate portion 23b in which an opening 23a is formed and a plurality of springs 23c. The second positioning portion 24 has a flat plate portion 24b in which an opening 24a is formed and a plurality of springs 24c. The opening 23a and the opening 24a form a penetration opening 22a of the holding member 22. The opening 23a and the opening 24a have rectangular or circular shapes. In the present embodiment, the opening 23a and the opening 24a have rectangular shapes. The flat plate portion 23b and the flat plate portion 24b are in contact with each other. When viewed from a direction orthogonal to the main surfaces 21a and 21b of the electron emission plate 21, the emission surface 21d of the electron emission plate 21 is disposed inside an edge that defines the opening 23a and the opening 24a.

The plurality of springs 23c extends in different directions from each other. In the present embodiment, the plurality of springs 23c is disposed in a circumferential direction of the holding member 22 so as to be rotationally symmetric when viewed from an axis HA direction of the holding member 22. The plurality of springs 24c extends in different directions from each other. In the present embodiment, the plurality of springs 24c is disposed in the circumferential direction of the holding member 22 so as to be rotationally symmetric when viewed from the axis HA direction of the holding member 22.

In the present embodiment, the plurality of springs 23c and 24c is disposed at equal intervals in the circumferential direction of the pipe shaft TA along the side surface 10a of the housing 10, respectively. The plurality of springs 24c is disposed on the window 11a side of the plurality of springs 23c when viewed from a direction orthogonal to the axis HA of the holding member 22. In the present embodiment, the first positioning portion 23 and the second positioning portion 24 have four springs 23c and four springs 24c, respectively.

The first positioning portion 23 and the second positioning portion 24 position the holding member 22 with respect to the housing 10 by the plurality of springs 23c and the plurality of springs 24c. Each spring 23c of the first positioning portion 23 extends in the direction of the axis HA of the holding member 22 and in the direction orthogonal to the axis HA. Each spring 23c abuts on the side surface 10a of the housing 10 at a tip and applies an biasing force F1. The first positioning portion 23 prevents the holding member 22 from moving in the pipe shaft TA direction of the housing 10 due to a frictional force between the plurality of springs 23c and the side surface 10a of the housing 10.

Each spring 24c of the second positioning portion 24 extends in an opposite direction to a direction in which the plurality of springs 23c extends when viewed from a direction orthogonal to the axis HA of the holding member 22. Each spring 24c has a T-shape, and a tip thereof is divided into two parts. The tips of the each spring 24c are separated in directions opposite from each other in the circumferential direction of the holding member 22 when viewed from the axis HA direction of the holding member 22. Each spring 24c abuts on the side surface 10a of the housing 10 at two tips and applies an biasing force F2. Each spring 24c elastically holds the position of the holding member 22 inside the housing 10 in the direction orthogonal to the pipe shaft TA of the housing 10.

The base portion 25 has a flat plate portion 25b in which an opening 25a is formed. The base portion 25 is in contact with the main surface 21a of the electron emission plate 21 at the flat plate portion 25b. The opening 25a forms a penetration opening 22a of the holding member 22. The base portion 25 is in contact with the main surface 21a of the electron emission plate 21 at an edge defining the opening 25a. When viewed from a direction orthogonal to the main surfaces 21a and 21b of the electron emission plate 21, the incident surface 21c of the electron emission plate 21 is disposed inside the edge defining the opening 25a. The opening 25a has a rectangular or circular shape. In the present embodiment, the opening 25a has a rectangular shape. In the present embodiment, the base portion 25 has a U-shape in a cross section passing through the axis HA of the holding member 22, and further has a frame 25c extending from a peripheral edge of the flat plate portion 25b to the opposite side from the spacer 26 side in the axis HA direction of the holding member 22.

The spacer 26 is interposed between the base portion 25 and the frame plate portion 27. The spacer 26 has a flat plate portion 26b in which the opening 26a is formed. The opening 26a forms a penetration opening 22a of the holding member 22. The opening 26a of the spacer 26 has a shape along an edge of the electron emission plate 21. That is, the spacer 26 surrounds the edge of the electron emission plate 21. The opening 26a has a rectangular or circular shape. In the present embodiment, the opening 26a has a rectangular shape. The edge of the opening 26a is in contact with the edge of the electron emission plate 21.

The spacer 26 positions the electron emission plate 21 with respect to the holding member 22 in a direction orthogonal to the axis HA of the holding member 22. A thickness T1 of the spacer 26 is equal to or less than a thickness T2 of the electron emission plate. In the present embodiment, the thickness T1 of the spacer 26 is smaller than the thickness T2 of the electron emission plate.

The frame plate portion 27 is formed of a single plate. An opening 27a is formed in the frame plate portion 27. The opening 27a forms the penetration opening 22a of the holding member 22. The frame plate portion 27 has a flat plate portion 27b and a plurality of biasing portions 27c (electron emission plate biasing portions). The flat plate portion 27b and the plurality of biasing portions 27c are integrally formed. The flat plate portion 27b is in contact with the spacer 26, and each biasing portion 27c is in contact with the electron emission plate 21. The flat plate portion 27b interposes the spacer 26 between the flat plate portion 27b and the base portion 25. The opening 27a is defined by the flat plate portion 27b and the plurality of biasing portions 27c. As illustrated in FIG. 5, when viewed from a direction orthogonal to the main surfaces 21a and 21b of the electron emission plate 21, the emission surface 21d of the electron emission plate 21 is disposed inside the edge defining the opening 27a.

Each biasing portion 27c is in contact with the edge of the main surface 21b of the electron emission plate 21. Each biasing portion 27c elastically biases the electron emission plate 21 with respect to the flat plate portion 25b of the base portion 25 by applying an biasing force F3 to the edge of the main surface 21b. Each biasing portion 27c is electrically connected to the main surface 21b. That is, the holding member 22 is electrically connected to the main surface 21b through the plurality of biasing portions 27c. The electron emission plate 21 is electrically connected to the wire 13 connected to the holding member 22 through the plurality of biasing portions 27c.

The plurality of biasing portions 27c is disposed at different positions in the circumferential direction of the edge of the opening 27a, and projects in directions facing each other. Each biasing portion 27c projects from the flat plate portion 27b toward the axis HA of the holding member 22 in a direction orthogonal to the axis. In other words, each biasing portion 27c extends from the flat plate portion 27b to a center side of the opening 27a (the shaft HA side of the holding member 22). In the present embodiment, the plurality of biasing portions 27c is disposed so as to be rotationally symmetric when viewed from the axis HA direction of the holding member 22.

In the present embodiment, each biasing portion 27c has a plate shape and functions as a leaf spring that biases the electron emission plate 21 to the base portion 25. Each biasing portion 27c is formed flush with the flat plate portion 27b in a state before being in contact with the electron emission plate 21. As illustrated in FIG. 6, each biasing portion 27c is elastically deformed by coming into contact with the edge of the main surface 21b of the electron emission plate 21, and the biasing force F3 is applied to the main surface 21b of the electron emission plate 21. A thickness T3 of each biasing portion 27c is smaller than the thickness T2 of the electron emission plate 21. The thickness T3 of each biasing portion 27c is smaller than the thickness T1 of the spacer 26. The thicknesses T3 of the flat plate portion 25b and each biasing portion 27c are the same. Note that "same" includes a range of manufacturing tolerance.

In the present embodiment, the plurality of biasing portions 27c has a shape in which a plurality of notch-shaped gaps 27d are provided in a radial direction of the holding member 22 (direction orthogonal to the axis HA of the holding member 22) at an edge of a rectangular opening located at a center of the frame plate portion 27. In the present embodiment, the plurality of biasing portions 27c has a shape in which notch-shaped gaps 27d are provided at the four corners of the edge of the rectangular opening. In the present embodiment, each of the plurality of biasing portions 27c is provided on one of sides of the edge of the rectangular opening.

In the present embodiment, each biasing portion 27c has a shape in which a plurality of notch-shaped gaps 27e is provided on the above-mentioned side. That is, each biasing portion 27c is divided into a plurality of parts 27f by the gap 27e. Each of the plurality of parts 27f is a metal piece that elastically biases the electron emission plate 21 to the base portion 25. In the present embodiment, each biasing portion 27c is divided into three rectangular parts 27f in a plan view. Each biasing portion 27c may be divided into two parts or may be divided into four or more parts.

Next, a description will be given of an operation when an electromagnetic wave enters the electron tube 1 in the present embodiment. A voltage is applied to the holding member 22, the dynodes 32a to 32j, and the anode 41, respectively, through the wires 13. At this time, a voltage is applied to the electron emission plate 21 through the frame plate portion 27 of the holding member 22. The voltage applied to each of the holding member 22, the dynodes 32a to 32j, and the anode 41 is set so as to gradually increase as the holding member 22 approaches the anode 41.

The electromagnetic wave passes through the window 11a of the housing 10, and then the electromagnetic wave enters the opening 25a of the base portion 25 of the holding member 22. The electromagnetic wave passing through the opening 25a is incident on the incident surface 21c of the electron emission plate 21. The electron emission plate 21 emits electrons from the emission surface 21d in response to an incident of an electromagnetic wave. The electrons emitted from the electron emission plate 21 pass through the opening 27a of the frame plate portion 27, the opening 24a of the second positioning portion 24, and the opening 23a of the first positioning portion 23 in this order, and then are guided to the incident surface 35 of the electron multiplying unit 30.

The electrons emitted from the electron emission plate 21 are converged by the focusing electrode 31 and sent to a first-stage dynode 32a (incident surface 35). When electrons enter the first-stage dynode 32a (incident surface 35), secondary electrons are emitted from the dynode 32a toward the second-stage dynode 32b. When electrons enter the second-stage dynode 32b, secondary electrons are emitted from the dynode 32b toward the third-stage dynode 32c. In this way, electrons are sequentially transmitted from the first-stage dynode 32a to the tenth-stage dynode 32j while being multiplied. That is, the electrons emitted from the electron emission plate 21 are cascade-multiplied by the electron multiplying unit 30. The electrons multiplied by the electron multiplying unit 30 are collected by the anode 41, which is the electron collecting unit 40, and are output as an output signal from the anode 41 through the wires 13.

Figure 7:
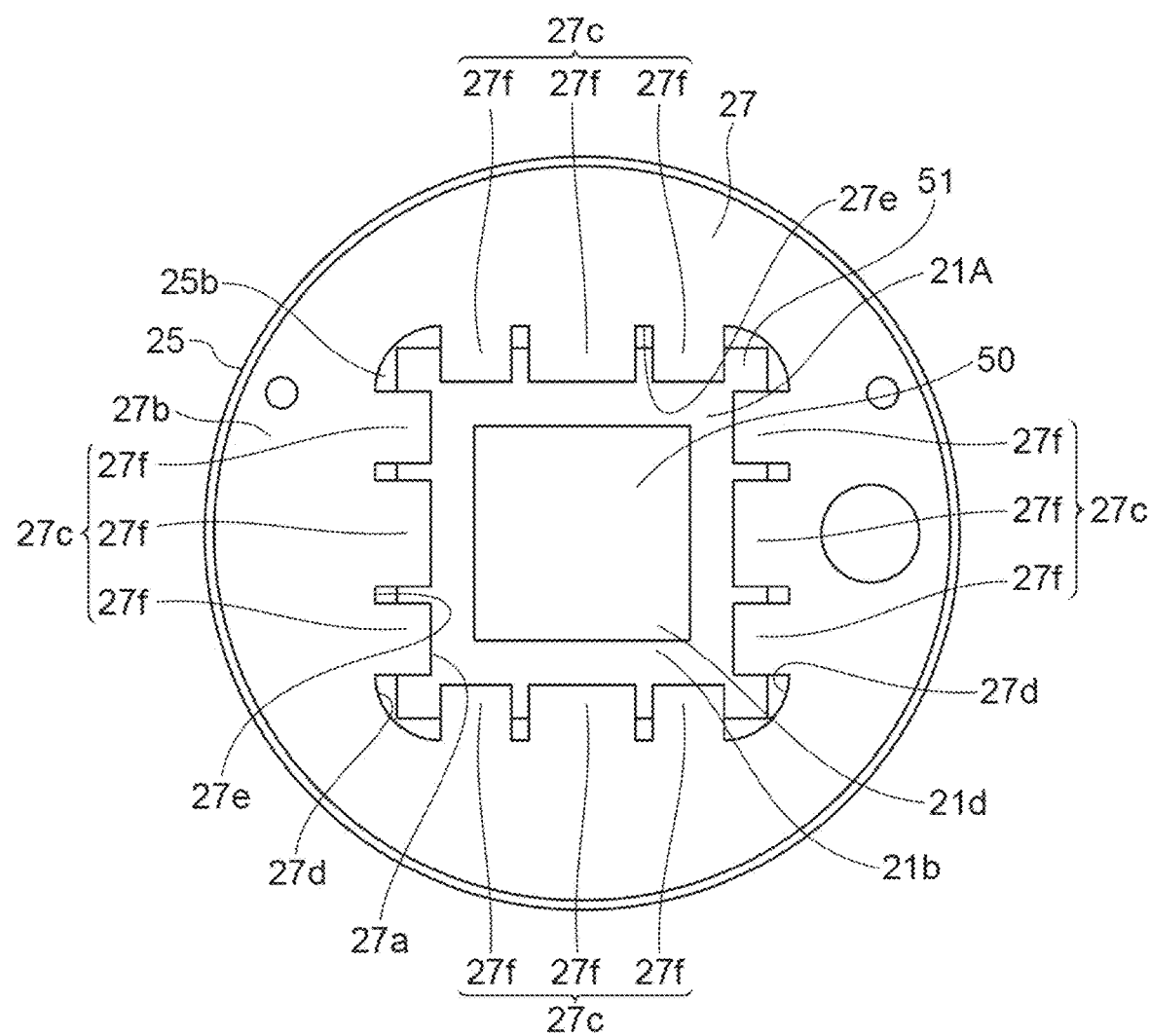
FIG. 7 is an enlarged plan view illustrating a state in which a frame plate portion biases an electron emission plate in an electron tube according to a modification of the present embodiment.

Next, an electron tube according to a modification of the present embodiment will be described with reference to FIG. 7. FIG. 7 is an enlarged plan view illustrating a state in which the frame plate portion 27 is biasing the electron emission plate 21 in the electron tube 1 according to the modification. The modification illustrated in FIG. 7 is generally similar to or the same as the above-described embodiment.

However, the modification is different from the above-described embodiment in that an electron emission plate 21A is held by a holding member 22 instead of the electron emission plate 21. Hereinafter, a difference between the above-described embodiment and the modification will be mainly described.

In this modification, the electron emitting unit 20 has the electron emission plate 21A that emits electrons in response to an incident of an electromagnetic wave, and the holding member 22 that holds the electron emission plate 21A. Similarly to the electron emission plate 21, the electron emission plate 21A has a main surface 21a and a main surface 21b facing each other. The main surface 21a faces the window 11a. The main surface 21a includes an incident surface 21c on which an electromagnetic wave having passed through the window 11a is incident. The main surface 21b includes an emission surface 21d that emits electrons.

The electron emission plate 21A has a metasurface 50 and a substrate 51 provided with the metasurface 50. The substrate 51 has an electromagnetic wave transmitting property against an electromagnetic wave transmitted through the window 11a. That is, the substrate 51 transmits at least a part of the frequency band of the electromagnetic wave transmitted through the window 11a. The substrate 51 is made of, for example, silicon. The substrate 51 has a rectangular shape in a plan view. In this embodiment, the substrate 51 is separated from the window 11a and the electron multiplying unit 30.

The substrate 51 has a main surface 21a and a main surface 21b facing each other, similarly to the electron emission plate 21. For example, when the main surface 21a is included in the first main surface, the main surface 21b is included in the second main surface. The main surface 21a and the main surface 21b are disposed parallel to the window 11a. The main surface 21a faces the window 11a. The main surface 21a includes the incident surface 21c on which an electromagnetic wave having passed through the window 11a is incident.

The metasurface 50 is provided on the main surface 21b. The metasurface 50 emits electrons in response to an incident of an electromagnetic wave. That is, the metasurface 50 includes the emission surface 21d that emits electrons. As illustrated in FIG. 7, when viewed from a direction orthogonal to the main surfaces 21a and 21b of the electron emission plate 21, the metasurface 50 is disposed inside the edge defining the opening 27a of the frame plate portion 27. In this way, when viewed from a direction orthogonal to the main surfaces 21a and 21b of the electron emission plate 21, the incident surface 21c and the emission surface 21d of the electron emission plate 21 are disposed inside the edge defining the penetration opening 22a of the holding member 22.

The metasurface 50 is included in a patterned oxide layer or patterned metal layer on the main surface 21b of the substrate 51. The oxide layer is, for example, titanium oxide. The metal layer is, for example, gold. The metasurface 50 has a rectangular shape in a plan view. In the present embodiment, the metal layers included in the metasurface 50 form a plurality of antennas on the main surface 21b.

The smaller the size of the antennas of the metasurface 50, the more sensitive it is to an electromagnetic wave having a shorter wavelength, that is, an electromagnetic wave having a higher frequency. By changing the structure of the antennas, the metasurface 50 can correspond to a frequency band of about 0.01 to 50 THz, that is, a frequency band of so-called millimeter wave to mid-infrared light. That is, the metasurface 50 can correspond to a frequency band including a so-called terahertz wave.

Next, a description will be given of an operation when an electromagnetic wave enters the electron tube 1 in this modification. The electromagnetic wave passes through the window 11a of the housing 10, and then the electromagnetic wave enters the opening 25a of the base portion 25 of the holding member 22. The electromagnetic wave passing through the opening 25a is incident on the incident surface 21c of the substrate 51. The electromagnetic wave incident on the incident surface 21c passes through the substrate 51 and is incident on the metasurface 50 provided on the main surface 21b of the substrate 51. The metasurface 50 emits electrons in response to the incident of electromagnetic wave. The electrons emitted from the metasurface 50 pass through the opening 27a of the frame plate portion 27, the opening 24a of the second positioning portion 24, and the opening 23a of the first positioning portion 23 in this order, and then are guided to the incident surface 35 of the electron multiplying unit 30.

As described above, in the electron tube 1, the plurality of biasing portions 27c of the holding member 22 elastically bias the electron emission plate 21 to the base portion 25. Therefore, even when there is some manufacturing error or deformation by a temperature change in each member of the electron tube 1, the plurality of biasing portions 27c are in stable contact with the electron emission plate 21. The holding member 22 is electrically connected to the main surface 21b of the electron emission plate 21 through the plurality of biasing portions 27c. Therefore, the stability of the voltage applied to the main surface 21b of the electron emission plate 21 through the plurality of biasing portions 27c of the holding member 22 is improved.

The plurality of biasing portions 27c is disposed at positions that are rotationally symmetric when viewed from the normal direction of the main surface 21b. In this case, the biasing force F3 is evenly applied to the electron emission plate 21 by the plurality of biasing portions 27c. Therefore, the electron emission plate 21 is in stable contact with the plurality of biasing portions 27c.

The thickness T3 of each biasing portion 27c is smaller than the thickness T2 of the electron emission plate 21. Therefore, the biasing force F3 applied to the electron emission plate 21 from each biasing portion 27c is reduced. Therefore, the damage of the electron emission plate 21 is suppressed.

Each biasing portion 27c is divided into the plurality of parts 27f. Each of the plurality of parts 27f elastically biases the electron emission plate 21 to the base portion 25. Therefore, the biasing force from each biasing portion 27c is more stably applied to the electron emission plate 21. Therefore, the electron emission plate 21 comes into contact with the plurality of biasing portions 27c more stably.

The flat plate portion 27b is integrally formed with the plurality of biasing portions 27c. The spacer 26 is interposed between the base portion 25 and the flat plate portion 27b and surrounds the edge of the electron emission plate 21. The plurality of biasing portions 27c projects from the flat plate portion 27b and elastically biases the electron emission plate 21 with respect to the base portion 25. The thickness T1 of the spacer 26 is equal to or less than the thickness T2 of the electron emission plate 21.

In this case, the spacer 26 surrounding the edge of the electron emission plate 21 more reliably holds the electron emission plate 21 in a direction orthogonal to a thickness direction of the electron emission plate 21. Since the thickness T1 of the spacer 26 is equal to or less than the thickness T2 of the electron emission plate 21, the biasing force F3 applied to the electron emission plate 21 in the thickness direction of the electron emission plate 21 by the plurality of biasing portions 27c is stably ensured in the state illustrated in FIG. 6. Therefore, the electron emission plate 21 is more reliably held in the thickness direction of the electron emission plate 21.

The base portion 25 is in contact with the main surface 21a at an edge defining the opening 25a. In this case, the electron emission plate 21 can be held more stably, and an electromagnetic wave can be incident on the electron emission plate 21.

The electron emission plate 21 is a field assist type photocathode. In this case, an electric field is formed on the electron emission plate 21, and electrons are emitted from the main surface 21b of the electron emission plate 21 by the electric field. Therefore, the electron emission plate 21 emits electrons from the main surface 21b in response to an incident of an electromagnetic wave having a frequency band from infrared light to ultraviolet light, for example.

The electron emission plate 21 has a metasurface 50 that emits electrons in response to an incident of an electromagnetic wave. In this case, the electron emission plate 21 emits electrons from the metasurface 50 in response to the incident of the electromagnetic wave in a frequency band from millimeter waves to infrared light, for example.

The plurality of springs 23c and 24c of the holding member 22 positions the holding member 22 with respect to the housing 10 by applying biasing forces F1 and F2 to the inner side surface 10a of the housing 10. In this case, the holding member 22 is stably held with respect to the housing 10 even when there is some manufacturing error or deformation by a temperature change in each member of the electron tube 1.

Even though the embodiment and modification of the present invention have been described above, the present invention is not necessarily limited to the above-described embodiment and modification, and various modifications can be made without departing from the gist thereof.

For example, in the present embodiment and modification, a description has been given of a case where the electron tube 1 is a photomultiplier tube. However, the present invention is not limited thereto. The electron tube 1 may be a so-called image intensifier, a streak tube, an image pickup device, etc. In this case as well, the holding member 22 positions the electron emission plate 21 with respect to the housing 10 so that the main surface 21a of the electron emission plate 21 faces the window 11a of the housing 10.

In the present embodiment and modification, a description has been given of a configuration in which each biasing portion 27c is divided into the plurality of parts 27f by the gap 27e. However, each biasing portion 27c may be formed as one metal piece. For example, each biasing portion 27c may be one metal piece having a rectangular shape in a plan view.

The housing 10 is not limited to the cylindrical shape. For example, the housing 10 may have a tubular shape having a polygonal cross section.

In the present embodiment, a description has been given of a configuration in which the holding member 22 has the frame plate portion 27. However, it is possible to adopt a configuration in which the plurality of biasing portions 27c extends from the edge of the flat plate portion 25b of the base portion 25. In this case, the plurality of biasing portions 27c may extend from the edge of the flat plate portion 25b of the base portion 25 to the main surface 21b side of the electron emission plate 21 and then bend in a direction parallel to the main surface 21b. In this case as well, the plurality of biasing portions 27c is in contact with the edge of the main surface 21b, and the electron emission plate 21 is elastically biased to the flat plate portion 25b of the base portion 25.

REFERENCE SIGNS LIST

1: electron tube, 10: housing, 10a: side surface, 11a: window, 21: electron emission plate, 21a, 21b: main surface, 22: holding member, 23c, 24c: spring, 25: base portion, 25a, 27a: opening, 26: spacer, 27b: flat plate portion, 27c: biasing portion, 27f: part, 50: metasurface, T1, T2, T3: thickness.

The invention claimed is:

1. An electron tube comprising:
a housing having a window having an electromagnetic wave transmitting property;
an electron emission plate disposed inside the housing, the electron emission plate emitting electrons in response to an incident of the electromagnetic wave; and
a holding member disposed inside the housing to hold the electron emission plate and configured to apply a voltage to the electron emission plate,
wherein the electron emission plate has a first main surface and a second main surface facing each other, and
the holding member has a base portion being in contact with the first main surface, and a plurality of electron emission plate biasing portions which are in contact with an edge of the second main surface and are configured to elastically bias the electron emission plate to the base portion, and is electrically connected to the second main surface through the plurality of electron emission plate biasing portions.

2. The electron tube according to claim 1, wherein the plurality of electron emission plate biasing portions are disposed at rotationally symmetric positions when viewed from a normal direction of the second main surface.

3. The electron tube according to claim 1,
wherein the plurality of electron emission plate biasing portions have a plate shape, and
a thickness of each of the electron emission plate biasing portions is smaller than a thickness of the electron emission plate.

4. The electron tube according to claim 1,
wherein each of the electron emission plate biasing portions is divided into a plurality of parts, and
each of the plurality of parts elastically is configured to bias the electron emission plate to the base portion.

5. The electron tube according to claim 1,
wherein the holding member has:
a frame plate portion including the plurality of electron emission plate biasing portions and a flat plate portion integrally formed with the plurality of electron emission plate biasing portions, and
a spacer which is interposed between the base portion and the flat plate portion and surrounds an edge of the electron emission plate,
the plurality of electron emission plate biasing portions project from the flat plate portion and are configured to elastically bias the electron emission plate to the base portion, and
a thickness of the spacer is less than or equal to a thickness of the electron emission plate.

6. The electron tube according to claim 5,
wherein an opening defined by the plurality of electron emission plate biasing portions and the flat plate portion is formed in the frame plate portion, and
the plurality of electron emission plate biasing portions extend from the flat plate portion to a center side of the opening in directions facing each other.

7. The electron tube according to claim 1,
wherein an opening which an electromagnetic wave having passed through the window enters is formed in the base portion,
the opening has a rectangular shape or a circular shape, and
the base portion is in contact with the first main surface at an edge defining the opening.

8. The electron tube according to claim 1, wherein the electron emission plate is a field assist type photocathode.

9. The electron tube according to claim 1, wherein the electron emission plate has a metasurface configured to emit electrons in response to an incident of an electromagnetic wave.

10. The electron tube according to claim 1,
wherein the housing has a tubular shape, and
the holding member has a plurality of springs configured to position the holding member with respect to the housing by applying an biasing force to an inner side surface of the housing.

* * * * *